United States Patent [19]

Thomas

[11] Patent Number: 5,077,564

[45] Date of Patent: Dec. 31, 1991

[54] ARCUATE EDGE THERMAL PRINT HEAD

[75] Inventor: Lowell E. Thomas, Tewksbury, Mass.

[73] Assignee: Dynamics Research Corporation, Wilmington, Mass.

[21] Appl. No.: 470,952

[22] Filed: Jan. 26, 1990

[51] Int. Cl.[5] ...................... G01D 15/10; H01C 17/06

[52] U.S. Cl. .............................. 346/76 PH; 29/610.1; 29/621

[58] Field of Search .................. 346/76 PH; 29/610.1, 29/611, 620, 621

[56] References Cited

U.S. PATENT DOCUMENTS

| | | | |
|---|---|---|---|
| 3,814,897 | 6/1974 | Otani et al. | 219/216 |
| 4,096,510 | 6/1978 | Arai et al. | 357/28 |
| 4,259,564 | 3/1981 | Ohkubo et al. | 346/76 PH |
| 4,399,348 | 8/1983 | Bakewell | 219/216 |
| 4,423,425 | 12/1983 | Reese et al. | 346/76 PH |
| 4,636,811 | 1/1987 | Bakewell | 346/76 PH |
| 4,636,812 | 1/1987 | Bakewell | 346/76 PH |
| 4,651,168 | 3/1987 | Terajima et al. | 346/76 PH |
| 4,810,852 | 3/1989 | Bakewell | 219/216 |
| 4,968,996 | 11/1990 | Ebihara et al. | 346/76 PH |

OTHER PUBLICATIONS

Peckham R. F.; Thermal Printhead Technologies; Institute for Graphic Communications, Key Biscayne, Fla.—Jan. 1985.

*Primary Examiner*—Benjamin R. Fuller
*Assistant Examiner*—Gerald E. Preston
*Attorney, Agent, or Firm*—Weingarten, Schurgin, Gagnebin & Hayes

[57] ABSTRACT

A thermal print head is provided having a substrate with an arcuate edge ground to a selected radius upon which a layer of glaze is deposited and precision ground. Resistive film is patterned onto the glaze and conductive film is applied in electrical connection therewith.

21 Claims, 3 Drawing Sheets

ARCUATE EDGE THERMAL PRINT HEAD

FIELD OF THE INVENTION

This n relates to print heads and more particularly to edge type thermal print heads.

BACKGROUND OF THE INVENTION

Various types of electronic consumer and office products which contain the capability to generate hard copy, such as lap top computers, facsimile machines and the like, may contain thermal printers which incorporate a thermal print head that in combination with thermally sensitive paper generates the desired hard copy images. Various types of thermal print heads have evolved with the proliferation of such equipment. There are several common types of stationary line printing or row of dots thermal print heads, typically described by the location on a substrate of thermal elements which effect the actual production of images, including: center, near edge, and true edge print heads.

A center type print head typically has resistive printing elements located at the center of a large planar surface of a substrate. The resistive elements may be disposed on a layer or strip of glaze which elevates the printing elements from the substrate somewhat enhancing contact with the thermally sensitive print medium which is moved across the print elements parallel to the large planar surface of the substrate A near edge type print head typically has resistive printing elements located near an edge of a large planar surface of the substrate. Like the center type print head the thermally sensitive medium travels parallel to the large planar surface of the substrate.

FIGS. 1 and 2 illustrate center and near edge type thermal print heads according to the prior art. A substrate 10, typically alumina, provides a base for a series of layers which are laminated thereon. A bead of glass 12 is disposed on the substrate 10 first, usually by a high temperature thick film process. A layer of resistive material 14 provides resistive elements which are disposed over the glass 12 and substrate 10 and function as the heating elements that effect printing on the thermal medium. The glass 12 must be applied to facilitate optimal conduction of heat from resistive elements 14 to the substrate 10 such that enough heat is drawn off to allow proper cooling to optimize print speed while enough heat is retained for proper printing when an element is selected. The glass also serves to only slightly elevate functional elements for slightly better contact with a thermal sensitive medium. A layer of conductive material 16, typically aluminum or gold is deposited and patterned to form electrodes used to effect current flow to resistive material 14. Layers 18 and 20 are protective layers which serve to reduce head wear and resistor oxidation. In these prior art embodiments although resistive element characteristics may be controlled photolithographically, the glass bead 12 must be applied precisely and uniformly and composition of the glaze is a critical consideration. The composition of the glaze, which may include thermally conductive material, will depend on the dimensions of the glass bead. The glaze composition must also compensate for the thermal conductivity of the substrate 10. Depending on the substrate material, it may have thermal conduction properties that cause excess heat to be retained near the printing elements or excess heat to be conducted away therefrom.

While each of the various types of print heads can be found in use presently, it may be argued that true edge type thermal print heads enjoy advantages over center and near edge type heads. An edge type print head is illustrated in FIG. 3. Edge type typically have the resistive elements on an edge surface while conductive busses occupy a larger surface plane of the substrate. The substrate is usually orthogonally disposed with respect to the thermal paper which can be brought more uniformly into contact with the resistive elements disposed at the edge. The surface area of the edge can generally be shaped more evenly than top or bottom planes, resulting in higher quality printing because the resistive elements disposed thereon can be made more planar. Furthermore, with resistive elements disposed at an edge, less print head surface area comes into contact with the thermal recording paper, therefore: lesser pressing forces are required to maintain such contact; less wear occurs on the print head; the pressing mechanism may be simplified; and print quality is improved. Examples of edge type thermal print heads can be found in U.S. Pat. Nos. 4,399,348 and 4,636,811 to Bakewell and U.S. Pat. No. 4,651,168 to Terajima, et al.

Although edge type thermal print heads may be recognized as having advantages over center or near edge type thermal print heads, several problems have been identified with respect to this type of print head. Because edge type print heads are typically structures fabricated by alternately laminating conductive and insulating or dielectric layers on a substrate, as illustrated in the Bakewell patent and in FIGS. 2–10 of Terajima, dimensional considerations including physical and structural integrity of the substrate forming the base upon which resistive elements and conductive and insulating layers are disposed, may be critical. Considerable expense may arise from the need to assure that substrate surfaces are smooth and planar so that layers laminate properly thereon. The substrate or glaze layer disposed thereon must be uniformly dimensioned because resistor element length is determined by substrate width or glaze thickness and dot print uniformity affecting print quality is a function of the resistive element dimensions.

Although Terajima states that resistive element length may be controlled by the "simple expedient" of controlling film thickness of a glass layer applied to the substrate and that substrate smoothness may be effected by providing a glass layer between an electrode layer and the substrate, the provision of glass layers on the substrate is hardly a simple consideration. Since glaze thickness, according to the prior art, determines resistive element length and consequently resistive element values and because resistive element values determine print uniformity and quality, glaze thickness must be extremely precise and uniform. Furthermore, because the resistive elements come in contact with the glaze layer and the glaze layer effects thermal conductivity or thermal resistance, the glaze layer must be of a composition and amount such that resistive element thermal properties are optimized to facilitate proper printing on the thermal sensitive recording surface. The glaze layer must not be so thermally conductive that all the thermal energy is conducted away from the elements precluding printing. Likewise the glaze must not be so thermally resistant that all the thermal energy is concentrated at the elements without some conducted away. If thermal energy is retained at the elements print speed will be slowed because after heating up and printing each element must cool down so as not to print continuously. The element must properly heat up only when required to print and remain cool otherwise.

Additionally, application of glaze is generally a thick film process requiring high temperature deposition. Laminating high temperature dielectrics onto any thin metal layer (i.e. gold, aluminum, copper etc.) presents a problem of compromising the integrity of the metal layers, which likely will degrade when subject to the high temperatures required to fire the glaze.

In the embodiment of an edge type head shown in FIG. 3, a substrate 10′ typically alumina, forms a base on which to deposit other layers. A first metallic layer is deposited and patterned to form a plurality of electrodes 22. A first dielectric or insulating layer 24 is deposited on top of the plurality of electrodes 22. A second metallic layer, deposited on the first insulating layer 24 is not patterned, but serves as a conducting ground plane 26. A second insulating layer or dielectric cover 28 protects ground plane 26. A plurality of resistive elements 30 functioning as the heating or writing elements which effect imaging on the thermally sensitive medium are connected to ground plane 26 and respective electrodes 22 along an edge of the laminated structure. This prior art embodiment requires several duplicative steps, such as separately depositing each metallic layer. It also requires that thick film insulating layers be deposited, normally at very high temperature, on the metallic layers which likely would be degraded by such temperatures.

Furthermore, this prior art embodiment requires precise dimensioning of insulative layer 24 because its thickness determines the length of resistive elements 30 which affect print quality as discussed hereinbefore.

SUMMARY OF THE INVENTION

The present invention provides an edge-like thermal print head which does not require absolute uniformity of substrate dimensions or precision application of glaze .

According to the present invention, a substrate has an arcuate edge ground to a selected radius upon which a non-precise layer of glaze is deposited and precision ground. Resistive film is patterned onto the glaze and conductive film is applied in electrical connection therewith.

In further accord with the present invention, the construction of resistive elements, upon which print quality depends, is not dependent on absolute uniformity of substrate dimensions and/or glaze considerations, but is dependent upon simple photolithographic techniques.

Features of the thermal print head according to the present invention include: simplified construction requiring fewer steps and criticalities; and early application of thick film glaze thus avoiding subjecting thin film components to the high temperatures required in thick film deposition.

BRIEF DESCRIPTION OF THE DRAWINGS

These and other features and advantages of the present invention will become more apparent in light of the detailed description of an exemplary embodiment thereof, as illustrated in the accompanying drawings of which.

DETAILED DESCRIPTION OF THE INVENTION

Figure 1:
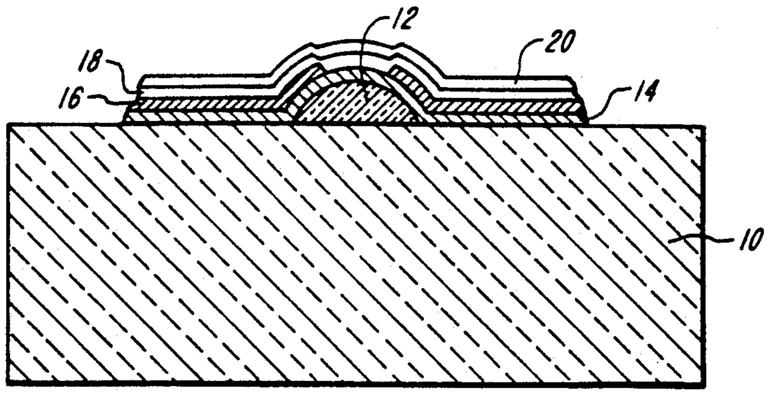
FIG. 1 (PRIOR ART)
FIG. 1 is an example of a center type thermal print head according to the prior art.
Figure 2:
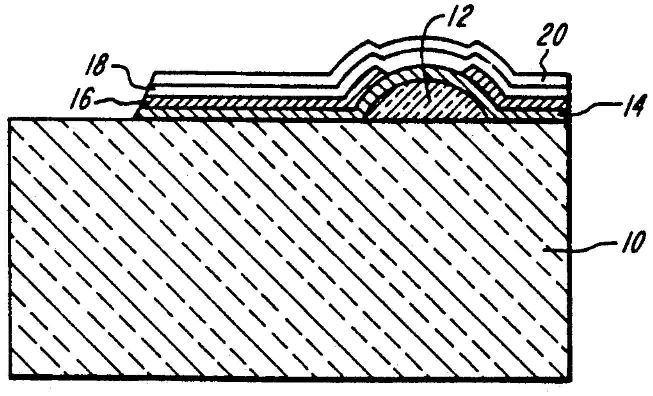
FIG. 2 (PRIOR ART)
FIG. 2 is an example of a near edge type thermal print head according to the prior art.
Figure 3:
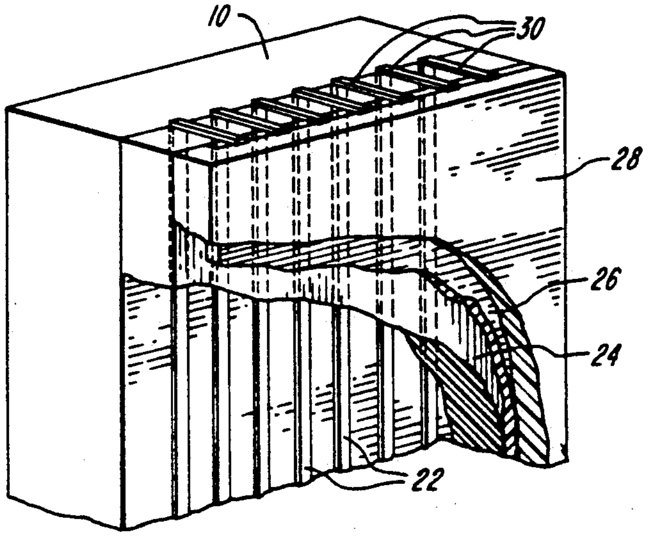
FIG. 3 (PRIOR ART)
FIG. 3 is an example of an edge type thermal print head according to prior art.
Figure 4:
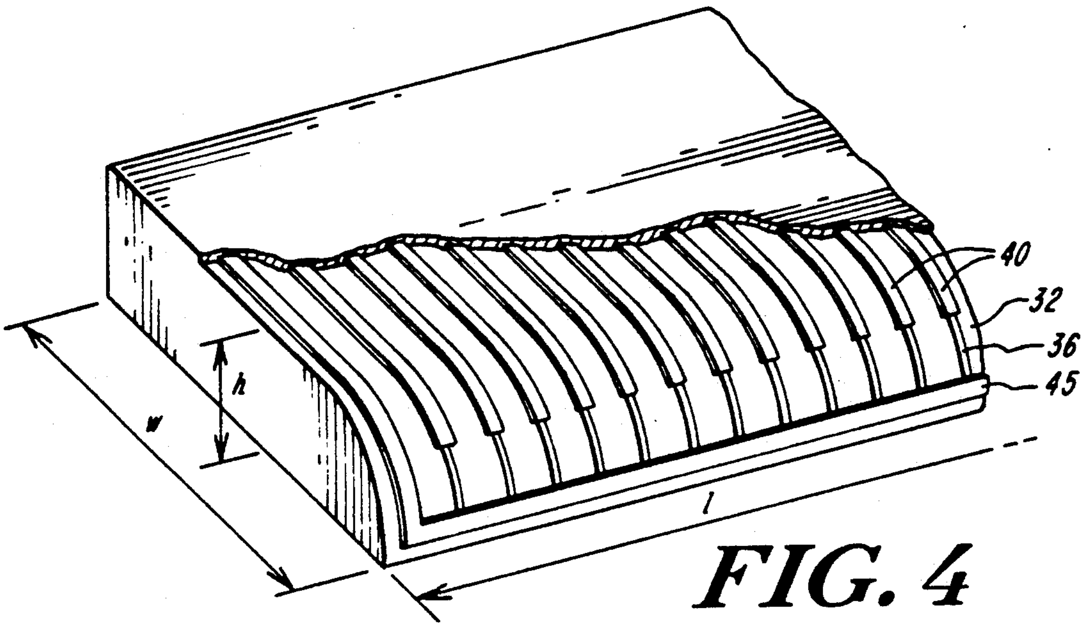
FIG. 4 is a perspective view partially broken away of an arcuate edge print head according to the invention.

Referring now to FIG. 4, an edge-like thermal print head according to the invention has a substrate 10″ typically made from alumina. The substrate 10″ is substantially rectangular having a height (h) typically in a range from 1 to 3 mm, a width (w) typically 3 to 6 cm and a length (l) typically about 30 cm. One edge of substrate 10″ is precision ground, forming an arcuate edge 32 having a radius of approximately 1 to 3.5 mm. The radius of arcuate edge 32 may be varied as necessary to provide the best possible print quality.

Figure 5:
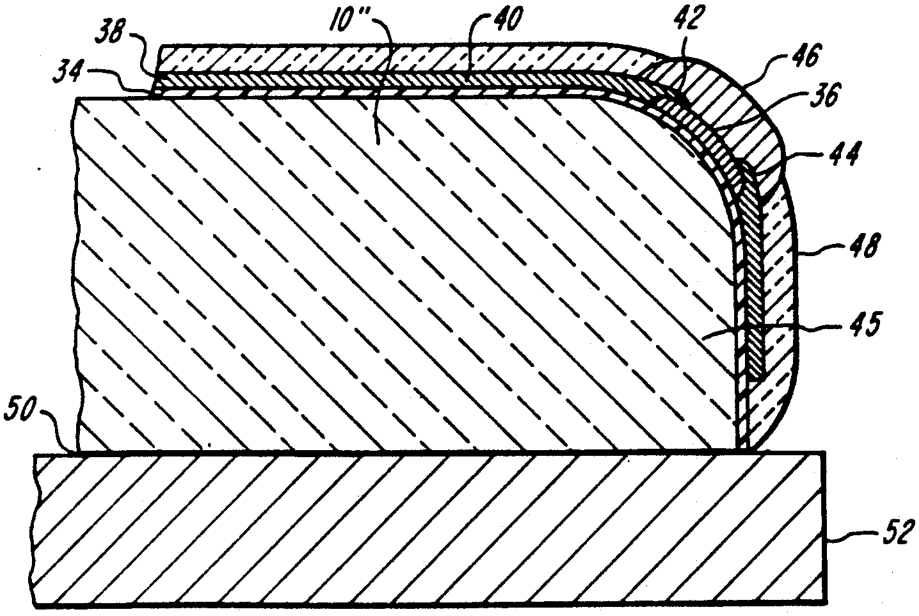
FIG. 5 is a side view of an arcuate edge thermal print head according to the invention.

As illustrated in FIGS. 4 and 5, an arcuate edge thermal print head is fabricated by depositing certain materials along the arcuate edge 32 of the substrate 10″. Initially a glaze is deposited and precision ground to form glaze layer 34. The glaze is typically deposited by a thick film high temperature process and may be ground and polished to achieve a high degree of uniformity and smoothness. The thickness of the glaze is typically 40–80 microns. The glaze may be deposited and precision lapped to the desired thickness to optimize thermal conductivity.

A resistive material, typically titanium silicide or tantalum carbide may then be deposited as a thin film along the arcuate edge 32 of substrate 10″. The resistive material may be patterned by photolithographic techniques and sputter deposited into a row of rectangular segments 36 wrapped around the arcuate edge 32 at the approximate midpoint of the arc.

A conductive film, typically aluminum or gold may be patterned and deposited on the glaze in a one time, two step process of patterning and deposition. The conductive film 38 is patterned such that electrode leads 40 are disposed on a large planar surface of the substrate on top of the glaze in contact with a first side 42 of resistive rectangular segment 36. Electrode leads contact a second side 44 of resistive rectangular segment 36 and terminate into a common electrode 45 along a flat portion of arcuate edge 32. A protective film 46, typically tantalum pentoxide, is sputter deposited to cover most or all of arcuate edge 32 to provide enhanced wear properties of the edge that will be subject to prolonged contact with the thermally sensitive medium. A dielectric layer 48 of green glass or epoxy may be deposited over any exposed conductive elements for protection against inadvertent electrical shorts.

The arcuate edge thermal print head may be mounted, via a layer of thermally conductive adhesive 50, to an aluminum block 52 which serves as a mechanical reference and a heat sink.

Figure 6:
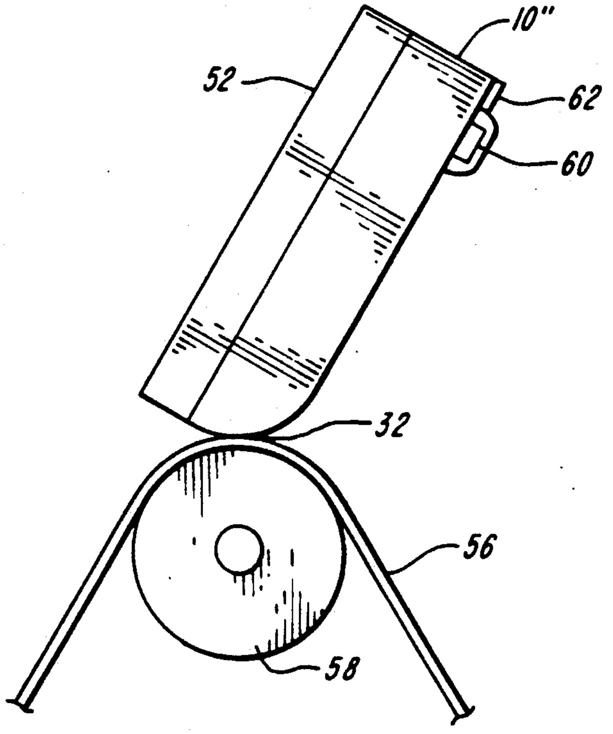
FIG. 6 is a side view of an arcuate edge thermal print head according to the invention, engaging thermal sensitive medium.

Referring now to FIG. 6, an arcuate edge thermal print head assembly is typically supported at an angle such that only the arcuate edge 32 contacts thermal sensitive medium 56, which typically is advanced along a roller 58. The print head assembly further comprises driver chips 60 mounted to patterned electrodes by wire bonding or other mounting techniques known in the art. Input leads 62 may be terminated by an acceptable connector mounted to the substrate 10″.

It should be appreciated by one of ordinary skill in the art, that although the application of various layers are described hereinbefore as generally involving patterning and sputter deposition, it will be appreciated that the order thereof may be reversed such that deposition precedes patterning.

Furthermore, one of ordinary skill in the thermal print head art may appreciate that although a range of radii has been specified hereinbefore with respect to the arcuate edge 32 of substrate 10″, a relationship between edge radius and head/medium contact pressure exists such that head force exerted against a medium will be a major determinant of the optimum radius for the arcuate edge 32 of the print head disclosed hereinbefore.

Although the invention has been shown and described with respect to an exemplary embodiment thereof, it should be understood by those skilled in the art that the foregoing and various other changes, omissions and additions in the form and detail thereof may be made therein without departing from the spirit and scope of the invention.

What is claimed is:

1. A printhead comprising:
- a substrate having a first side and a second side, and an arcuate surface disposed therebetween;
- a first dielectric layer disposed on said substrate, said first dielectric layer being precision ground to a predetermined contour in accordance with said first side, said second side and said arcuate surface, and said first dielectric layer being polished to a predetermined surface texture;
- a patterned resistive layer disposed on said first dielectric layer proximate said arcuate surface, forming a plurality of resistive elements having a first resistive edge and a second resistive edge;
- a patterned conductive layer disposed on said first side and said second side of said substrate, said patterned conductive layer comprising a plurality of electrode leads disposed on one of said first side and said second side and a common bus disposed on the other of said first side and said second side.

2. The print head of claim 1 wherein said substrate is alumina.

3. The printhead of claim 1 wherein said first dielectric layer is deposited via a thick film deposition process.

4. The print head of claim 1 wherein said conductive layer and said resistive layer are disposed on said first dielectric layer via a thick film deposition process.

5. The print head of claim 1 wherein said conductive layer and said resistive layer are disposed on said first dielectric layer via a thin film deposition process.

6. The print head of claim 1 wherein said resistive layer comprises tantalum carbide.

7. The print head of claim 1 wherein said resistive layer comprises titanium silicide.

8. The print head of claim 1 further comprising:
- a second dielectric layer disposed entirely over said conductive layer and said resistive layer.

9. The print head of claim 1 further comprising
- a second dielectric layer disposed entirely over said resistive layer; and
- a third dielectric layer disposed over said conductive layer.

10. The printhead of claim 9 wherein said second dielectric layer comprises tantalum pentoxide.

11. The print head of claim 9 wherein said second dielectric layer reduces wear and inhibits oxidation of said resistive layer.

12. A method of constructing a thermal print head including the steps of:
- forming a substrated having a first side, a second side and a substantially arcuate surface therebetween;
- depositing a first imprecise dielectric layer on said substrated and said substantially arcuate surface;
- precision grinding and polishing said first imprecise dielectric layer to provide a finished surface to conform to a predetermined shape and surface finish;
- depositing a plurality of resistive elements on said finished surface;
- depositing a conductive layer on at least one of said first imprecise dielectric layer and said finished surface;
- patterning said conductive layer to provide a plurality of busses on said first side of said substrate, a plurality of gaps substantially proximate to said substantially arcuate surface and a common bus on said second side of said substrate, wherein said resistive elements reside in said plurality of gaps and are electrically connected to said plurality of busses and said common bus.

13. The method of constructing a thermal print head of claim 12 wherein forming said substrate includes grinding and polishing said first substantially arcuate edge.

14. The method of claim 12 wherein the step of depositing said first dielectric layer includes depositing a glaze via a thick film deposition technique.

15. The method of claim 12 wherein at least one of the steps of depositing said plurality of resistive elements and depositing said conductive layer includes thick film deposition techniques.

16. The method of claim 12 wherein at least one of the steps of depositing said plurality of resistive elements and depositing said conductive layer includes thin film deposition techniques.

17. The method of claim 12 the step of patterning said conductive layer further includes the steps of:
- applying a photoresist;
- applying a hard mask over said photoresist; and
- exposing said photoresist via light through said hard mask.

18. The method of claim 12 further including the step of depositing a second dielectric layer over said conductive layer and said plurality of resistive elements.

19. The method of claim 12 further including the steps of:
- depositing a second dielectric layer entirely over said resistive elements; and
- depositing a third dielectric layer over said conductive layer.

20. The method of claim 19 wherein said second dielectric layer reduces wear and inhibits oxidation of said plurality of resistive elements.

21. The printhead of claim 19 wherein said second dielectric layer comprises tantalum pentoxide.

* * * * *